Oct. 18, 1932.    C. G. HAWLEY    1,883,727
CONTINUOUS BLOW-OFF VALVE
Filed June 28, 1930    2 Sheets-Sheet 1

INVENTOR
CHARLES G. HAWLEY.
BY *Mason & Mason*
ATTORNEYS

Oct. 18, 1932.　　　C. G. HAWLEY　　　1,883,727
CONTINUOUS BLOW-OFF VALVE
Filed June 28, 1930　　　2 Sheets-Sheet 2
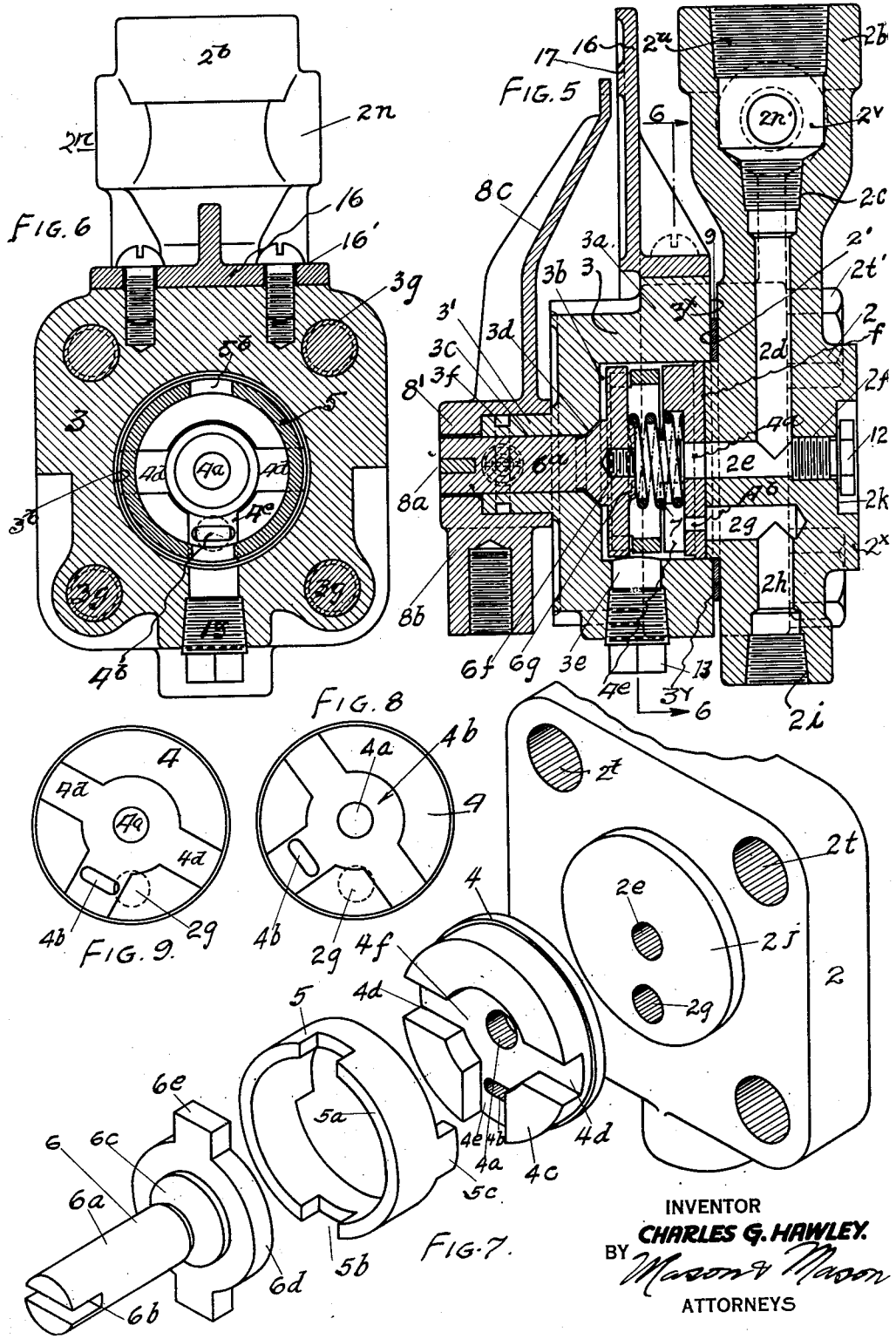
INVENTOR
CHARLES G. HAWLEY.
BY Mason & Mason
ATTORNEYS Patented Oct. 18, 1932

1,883,727

UNITED STATES PATENT OFFICE

CHARLES GILBERT HAWLEY, OF CHICAGO, ILLINOIS, ASSIGNOR TO CENTRIFIX CORPORATION, OF CLEVELAND, OHIO, A CORPORATION OF OHIO

CONTINUOUS BLOW-OFF VALVE

Application filed June 28, 1930. Serial No. 464,602.

This invention relates to improvements in valves of that small class intended for employment under high boiler pressures and for the discharge of minute streams of fluid. Operating continuously they are of necessity of very small capacity, as compared with the intermittent blow-off valves commonly used on steam boilers. Generally speaking, such small, limited capacity valves are most unsatisfactory, because they so readily become clogged, and because the swift passage of the fluid, generally containing impurities, causes enlargement of the opening provided by the valve, and worse still, erodes and scores the valve seats or meeting surfaces. Thus it will be seen that the situation is much more difficult than that presented by valves which are widely opened and closed. The very fact that the valves continue in operation without interruption brings about the evils by which the small high pressure valve suffers destruction.

The object of this invention is to provide a valve which shall overcome the above mentioned difficulties in a practical way and which, in addition, may be freely opened and closed and also adjusted with nicety. The further object of this invention is to provide a continuous blow-off valve which shall be peculiarly suited to the discharge of water from steam boilers, including those carrying the highest pressures; further, to provide a valve which shall be easy of manual adjustment, which shall be of strong and rugged construction and yet compact and of low cost. Still another object of the invention is to provide a self-indexing, adjustable, continuous blow-off valve and one which shall be composed of relatively few parts, and which may be easily assembled and taken apart by persons of ordinary skill.

It is realized that the foregoing brief statement must be accepted rather as a means of characterizing this invention than as a means of closely differentiating it from others of its general class. This invention is specifically differentiated from others by particular constructions, peculiar features, and combinations of parts whereby a valve of the foregoing general description is adapted to and made serviceable in the performance of the most exacting duties. The invention in its entirety will be readily understood upon reference to the following detailed description and the accompanying drawings, which form part thereof.

Figure 1:
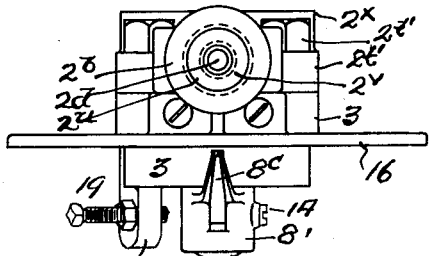
Figure 2:
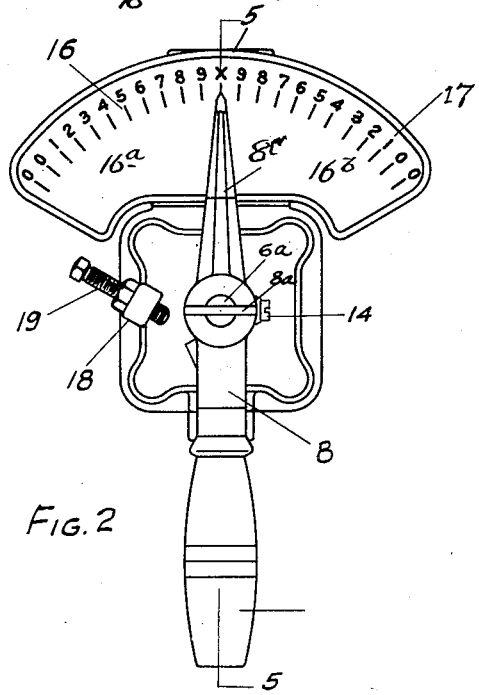
Figure 4:
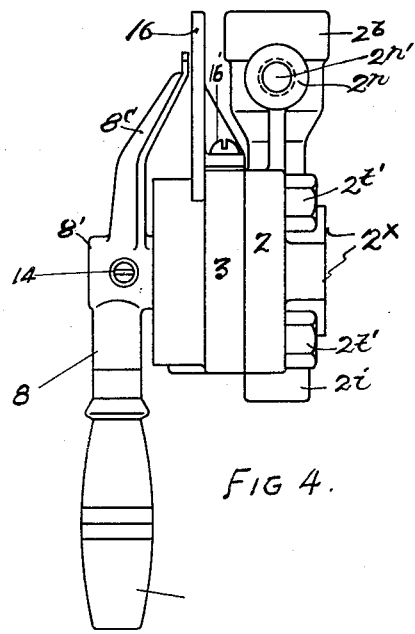
Figure 3:
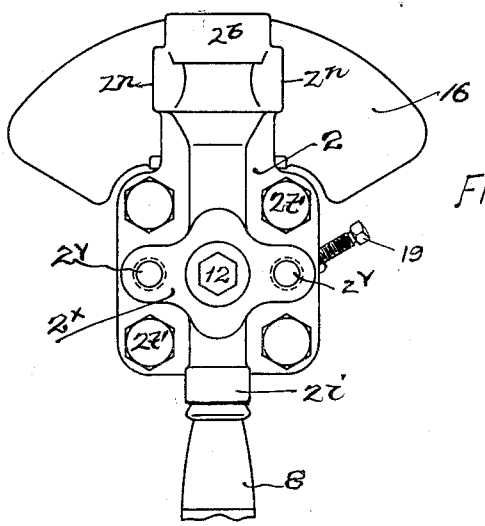

In said drawings, Fig. 1 is a plan view of a continuous blow-off valve embodying this invention. Fig. 2 is a face view thereof. Fig. 3 is a rear view. Fig. 4 is a side elevation. Fig. 5 is an enlarged vertical section of the valves substantially on the line 5—5 of Fig. 2. Fig. 6 is a transverse vertical section substantially on the irregular line 6—6 of Fig. 5. Fig. 7 is a perspective view illustrating the valve seat, the valve member and the valve actuating parts, so far separated one from the other as to clearly disclose both the constructions and the relations of those parts. Figs. 8 and 9 are diagrammatic face views of the movable valve member shown in two positions; one in an open position and the other in a closed position.

The difficulties above recited and which must be overcome may be properly accentuated at this point by the plain statement that valves of the present construction ordinarily operate under pressures of two hundred pounds or more and that the working size of the aperture afforded by the valve is of an area which rarely equals the area of a circle one-sixteenth inch in diameter. As will presently appear, the valve is also adapted to present an opening of greater size, such enlargement being necessary in order that the valve may be blown out or freed, should it become clogged.

The general construction of the device being made clear by the drawings, it may at once be said that the secret of success appears to reside in the formation of a tight, close and flat interface, $f$, between a fixed seat portion $2j$ and a rotatable disk or valve proper 4. The latter contains a slot-like port $4b$, and the seat portion contains a preferably round port $2g$ which is of greater width and larger area than the slot $4b$. By rotating the disk or member 4 upon its own axis either a part or all of the slot-like port $4b$ may be positioned to lap or communicate with the port 2g in the seat. By further rotation, the port 4b may be removed from the port 2g to any one of several positions in which the slot-like port will be completely closed by the opposing face of the seat member 2j. Normally, the extreme edge portions of the two ports slightly overlap and thus present a minute blow-off opening. The liquid under pressure reaches and presses upon the outer side of the disk 4 and the liquid escapes through the ports 4b and 2g in sequence. Pressure holds the disk against the seat 2j. Other means assist to that end as will be explained. The pressing of the disk against the seat 2j limits the escape of the pressure fluid to the minute opening presented by the slightly overlapping edges of the ports 4b and 2g. The liquid discharges into the much more capacious space or passage represented by the larger port 2g.

The employment of the larger port in the fixed seat obviously results in unbalancing the disc to the extent that the solid portion of the latter covers the port 2g. Hence the valve member 4 is very certainly pressed against the seat, but not so powerfully as to prevent the easy rotation of the disk.

Importantly, the foul liquid discharged causes these ports to plug or fill practically all of the slot 4b which is not exposed or lapped upon the larger port 2g, and, as the tendency of the liquid is to escape at every joint between the parts 4 and 2j, the deposit or mud filling the slot serves most advantageously to pack the edges of the slot against the opposing face 2j, and, as the exit of the liquid is limited to the open part of the port, scoring of the interface is admirably obviated.

The pressure of the liquid is relied upon to force the member 4 tightly against the seat 2j, but while the area of the disk is very large, the pressure upon the disk is virtually measured by the area of only that much of the solid part of the disk which remains above or across the exit port 2g; therefore the disk may be turned and adjusted upon the seat by the exercise of very little force.

For the turning of the disk as required to open, close and nicely adjust the capacity of the two ports, I provide a valve stem 6a and a handle 8 for the turning thereof. Theoretically, the stem should be truly perpendicular to the valve seat 2j, and if the stem were rigidly attached to the disk such true relation would be required. But it is most difficult to secure such accuracy in machined parts, and I therefore employ a flexible union between the stem 3c and the disk 4 and thus leave those parts free to seek their own adjustments. That union comprises a gimbal joint or universal coupler, as evidenced by the presence of the perpendicularly pivoted ring 5, between the disk 4 and the inner end of the valve stem 3c. Interlocking notches 4d and 5c loosely join one end of the ring 5 to the disk 4; and, perpendicularly related lugs 6c on the valve stem and notches 5b in the ring 5 serve to loosely join the outer end of the ring to the inner end of the valve stem. Most conveniently, the inner end of the valve stem is provided with a central boss 6g and the outer face of the disk is provided with a central sink 4f, and these parts receive a coiled spring 7 which tends to thrust the disk and valve stem apart but is restrained by the seat 2j at one end and by the casing member 3 at the other. The further utility of this arrangement will be explained hereinafter.

The disk should be made heavy enough to resist distortion, and yet it is desirable that the depth of the metal containing the port 4b shall not be so great as to make the slot likely to become plugged with deposits of mud. To secure these proportions, the disk member is notched or thinned in the region of the slot as illustrated at 4e.

The valve seat 2j is formed upon the larger member of the valve casing, said member comprising the body portion 2 which preferably is generally of rectangular form, modified however, by the middle upstanding integral portion 2b and by the depending integral boss 2i.

The face of the body portion is machined to present the packing surface 2' for the reception of the smaller and detachable member 3.

The surface 2j is finely ground or finished, as is the meeting face of the disk; and to facilitate the free grinding of the surface 2j, that surface is raised or projected beyond the packing surface 2'. Further, the raised portion is circular to correspond with the disk 4 but is of slightly greater diameter.

The back of the body portion is formed with a raised land 2x; for the reception of any supporting bracket or brace to which the valve may be attached. Threaded bolt holes 2y in this land receive the short bolts used for that purpose.

The cap member is of generally rectangular form and fits or registers with the shape of the body portion 2. The rectangular form is adopted for the accommodation of the four bolts 2t' which pass through holes 2t in the corners of the body portion and enter threaded holes 3g in the corners of the cap portion. A tight joint is effected by tightening the bolts and thus drawing the inner end of face 3x of the cap against the face 2' of the body portion, suitable packing 3y being interposed.

It will be seen that the heads of the bolts 2t' are lower than the face of the land 2x, so that the bolts do not interfere with any supporting bracket that may be employed as aforesaid.

Within the cap, and hence safely within the compass of the four bolts 2t', is a valve cavity 3z which takes its diameter from the portion 2j upon which the cap telescopes, as well shown in Fig. 5. The depth or length of the cavity 3z is sufficient to accommodate the disk 4, and the before described universal joint.

The cap is provided with a central boss 3' and contains the bore 3c to receive the valve stem 6a. In addition, the cap is provided with an internal conical surface 3d which accommodates the conical portion 6c provided at the inner end of the stem 6a, adjacent the circular T head 6d and integral with the same and the bearing lugs 6e.

The head 6d loosely fits the interior of the ring 5 to hold the same in place; and upon the turning of the stem 6a, the disk will be correspondingly turned against the seat 2j.

The coiled spring 7 constantly presses the disk upon that seat and at the same time presses the conical shoulder 6c against the conical seat 3d of the cap 3. Thus, both joints are tightly closed and made ready for the reception of pressure liquid.

Most conveniently, the pressure liquid enters the valve through the vertical bore 2d in the upstanding part 2b, and thence passes into the cavity 3b by way of the central passages 2e and 4a in the valve body and the disk, respectively. Both the initial and the ultimate pressure of the disk against the seat 2j, make possible the admission of the liquid through the same element which permits the departure of the liquid; in other words, the disk contains the central liquid admission opening 4a and the outlet slot 4b, and yet the direct passage of liquid from the opening 2e to the opening 2g is prevented by the pressure engagement of the intervening solid portion of the disk.

Port 2g connects with the vertical bore 2h at the bottom of the valve body and the lower end of the latter is threaded to receive a suitable discharge pipe, not shown. The upper end of the bore 2b is threaded to receive the incoming liquid pipe; and next above that joint, the body is enlarged to provide the cavity 2v, and the larger threaded opening 2u. The sides 2n of the enlarged part contain threaded holes 2n', one for the reception of a pipe plug (not shown) and the other to receive a pipe, not shown, through which a cooling liquid may be admitted to cool the contents of the pipe fastened in the top of the bore 2b. In practice that pipe is also surrounded by a larger pipe or jacket which is tightly screwed into the thread 2u, and which is provided with a liquid overflow at its top.

Cleanout plugs 12 and 13 are provided, respectively, at the end of the bore 2e and in the cap 3 at the bottom of the cavity 3b. The plug 12 has a further function as follows: It may be removed to allow the entrance of a temporary bolt, which latter, passing through the bore 2e, the hole 4a and the spring 7, enters a threaded socket 6f in the inner end of the valve steam. Such bolt facilitates the assembly of the valve elements proper in preparation for the placement of the cover plate or cap 3. After the cap is placed and secured by means of the bolts 2t, the temporary bolt is removed from the socket 6f and the plug 12 is restored to position, leaving the valve in condition for operation.

As will be understood from a comparison of Figs. 6, 8 and 9, the partial rotation of the valve stem and disk 4 serves to move the latter from a fully closed position to a fully open position. Intermediate movements expose smaller outlets or blow-off openings, the slot moving gradually across the large port 2g as the movement continues.

The handle 8 by which the disk is rotated, has a hub 8' which journals upon the extended boss 3' of the cap or cover plate 3; and the handle and valve stem are joined by a cross key 8a, passing through both parts, at a point beyond the end of the boss 3'. Displacement of the handle upon the stem is prevented by a set screw 14 in the hub and which is accommodated by a peripheral groove 3f in the hub 3'.

Upon further inspection of Figs. 6, 8, and 9, it will be clear that the variable blow-off slot 4b may be moved from a closed position and into register with the port 2g from either direction, and to indicate its position at the side thereof, I provide the handle with a pointer 8c and erect a dial plate 16 upon the top of the member 3 opposite the pointer. Graduations 17 present the maximum at the vertical center and the minimum markings at the lower ends of the dial or arc.

When frequent variations in the size of the blow-off openings are to be made, the side of the dial marked 16a is used. On the other hand, when the blow-off port is to remain fixed and is only occasionally opened (by swinging the handle 8) for purposes of blowing out the valve, then the dial side 16b is used, and an adjustable stop screw 19 held in the integral lug 18, provided on the cap 3, serves to limit the movement or return of the pointer and valve. By adjusting the stop screw, the exact positioning of the blow-off port is accomplished; and, perforce; when the valve is opened and reclosed, it is stopped by the screw 19 and thus is restored to the same condition.

As the valve continues in use for the discharge of a high pressure fluid, particularly such as are heavily burdened with solids, the slot 4b will be worn and elongated, but that fault is easily corrected by a minute closing movement of the disc, the greater part of the slot-like port being always inactive and closed by the opposing face 2j.

Due to this construction and the manner of its assembly, a valve of great accuracy and durability is secured. Further, the required size and the required strength are both attained in a structure which is of small size and of good appearance.

Having thus described my invention I claim as new and desire to secure by Letters Patent:—

1. A continuous blow-off valve of variable capacity, comprising a valve body containing a valve cavity and presenting a circular valve seat which forms one end of said cavity, a circular valve disk positioned within said cavity and faced against said seat, said body and disk together containing a central passage which forms the fluid inlet of said cavity, said body also containing a discharge port which is spaced from the inlet passage, said disk containing a correspondingly positioned discharge port which is of less width than said discharge port in the body, a disk-rotating stem rotatably mounted in said body at the other end of said cavity, a telescopically assembled flexible coupling positioned in said cavity and operatively uniting said disk and stem, an expansion spring confined between said disk and stem, and, self-indexing means provided upon the face of the body and coupled to the outer end of said stem.

2. A continuous blow-off valve of variable capacity comprising a valve body containing a valve cavity and presenting a circular valve seat which forms one end of said cavity, a circular valve disk positioned within said cavity and faced against said seat, said body and disk together containing a central passage which forms the fluid inlet of said cavity, said body also containing a discharge port which is spaced from the inlet passage, said disk containing a correspondingly positioned discharge port which is of less width than said discharge port in the body; a disk-rotating stem rotatably seated in said body at the other end of said cavity, comprising a cylinder having teeth on one end and grooves at the other and operatively keying lugs on said disk and stem, and expansion means confined within said cylinder and between said disk and stem substantially as illustrated and described.

3. A continuous blow-off valve of variable capacity comprising a valve body containing a valve cavity and presenting a circular valve seat which forms one end of said cavity, a circular valve disk positioned within said cavity and faced against said seat, said body and disk together containing a central passage which forms the fluid inlet of said cavity, said body also containing a discharge port which is spaced from the inlet passage, said disk containing a correspondingly positioned discharge port which is of less width than said discharge port in the body, a disk rotating stem rotatably seated in said body at the opposite end of said cavity, a telescopically assembled coupling positioned in said cavity, comprising a cylinder having teeth on one end and grooves at the other and operatively keying lugs on said disk and stem, expansion means confined within said cylinder and between said disk and stem, and self-indexing means provided upon the face of the body and coupled exteriorly to said stem substantially as illustrated and described.

In testimony whereof I have hereunto set my hand this 24th day of June, 1930.

CHARLES GILBERT HAWLEY.